United States Patent [19]

Ducasse

[11] 4,004,964
[45] Jan. 25, 1977

[54] MULTISTAGE CONTINUOUS VACUUM PAN

[75] Inventor: Joseph Christophe Victor Ducasse, Papaaloa, Hawaii

[73] Assignee: Unice Machine Company, San Francisco, Calif.

[22] Filed: Apr. 18, 1974

[21] Appl. No.: 462,080

[52] U.S. Cl. .................. 159/17 C; 159/28 VH; 159/27 B; 165/145
[51] Int. Cl.² ................ B01D 1/26; B01D 1/00; F28F 9/22
[58] Field of Search ............ 159/17 R, 17 P, 17 C, 159/28 R, 28 VH, 28 D, 27 B; 127/16; 165/145

[56] References Cited

UNITED STATES PATENTS

| | | | |
|---|---|---|---|
| 521,946 | 6/1894 | Cooper | 159/27 B |
| 881,523 | 3/1908 | Winter | 159/17 P |
| 984,754 | 2/1911 | Eijdman | 159/27 B |
| 1,021,486 | 3/1912 | Rusiecki | 159/28 VH |
| 2,023,738 | 3/1937 | Faber | 159/17 C |
| 3,099,607 | 7/1963 | Lustenader et al. | 159/28 VH |
| 3,554,800 | 1/1971 | Javet et al. | 159/28 VHS |
| 3,627,582 | 12/1971 | Dambrine | 127/16 |

FOREIGN PATENTS OR APPLICATIONS

| | | | |
|---|---|---|---|
| 624,330 | 1/1936 | Germany | 159/17 P |
| 96,055 | 5/1960 | Norway | 159/28 D |
| 835,645 | 5/1960 | United Kingdom | 159/47 R |
| 3,257 | 1893 | United Kingdom | 159/17 R |

*Primary Examiner*—Jack Sofer
*Attorney, Agent, or Firm*—Wendcroth, Lind & Ponack

[57] ABSTRACT

A pan for the continuous boiling of various liquids under vacuum includes an enclosed vessel divided into a series of interconnected compartments or stages provided with heating elements. During operation, boiling of the material is effected under optimum conditions as it flows continuously through the various stages from the feed end to the discharge end of the pan.

8 Claims, 6 Drawing Figures

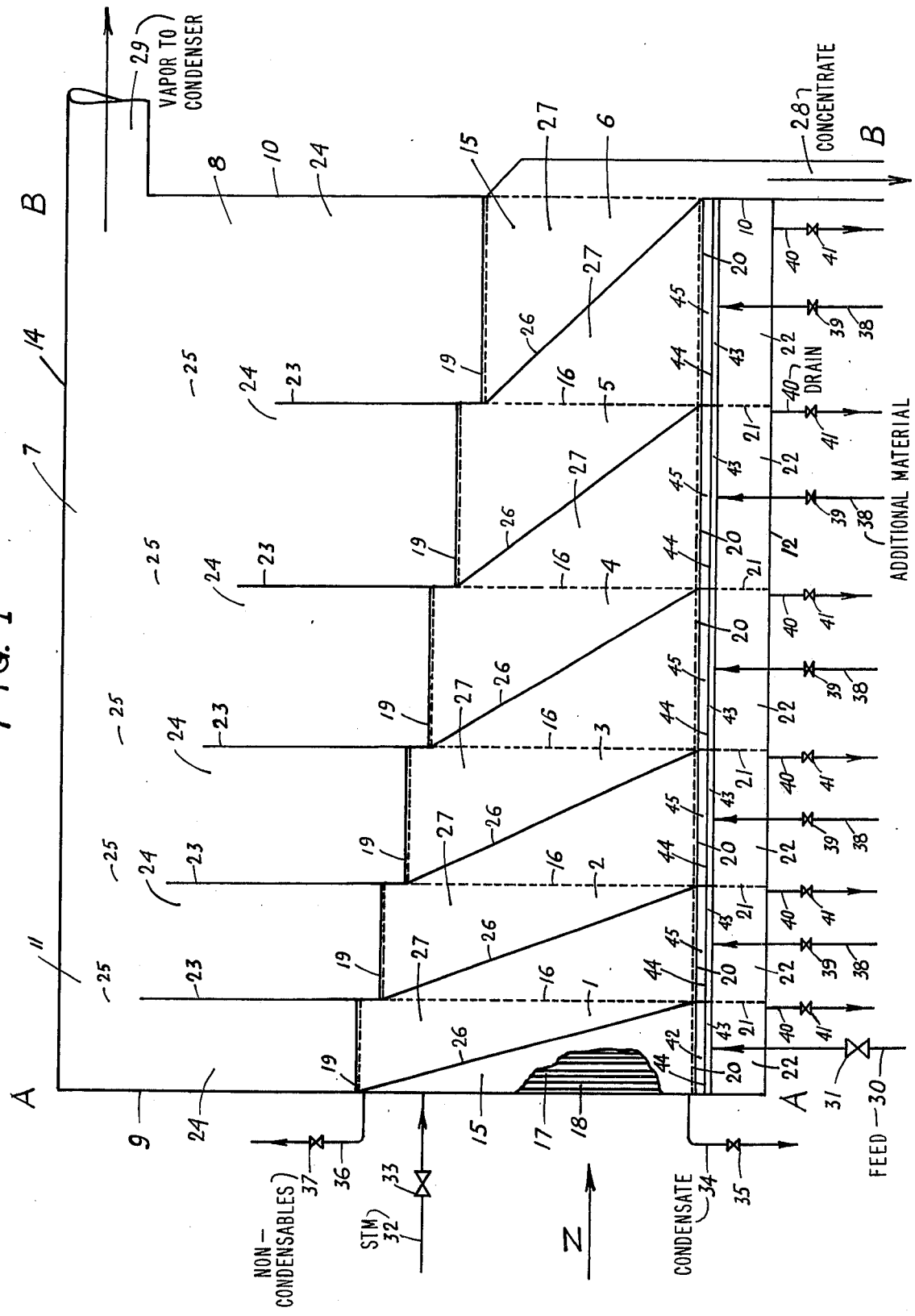

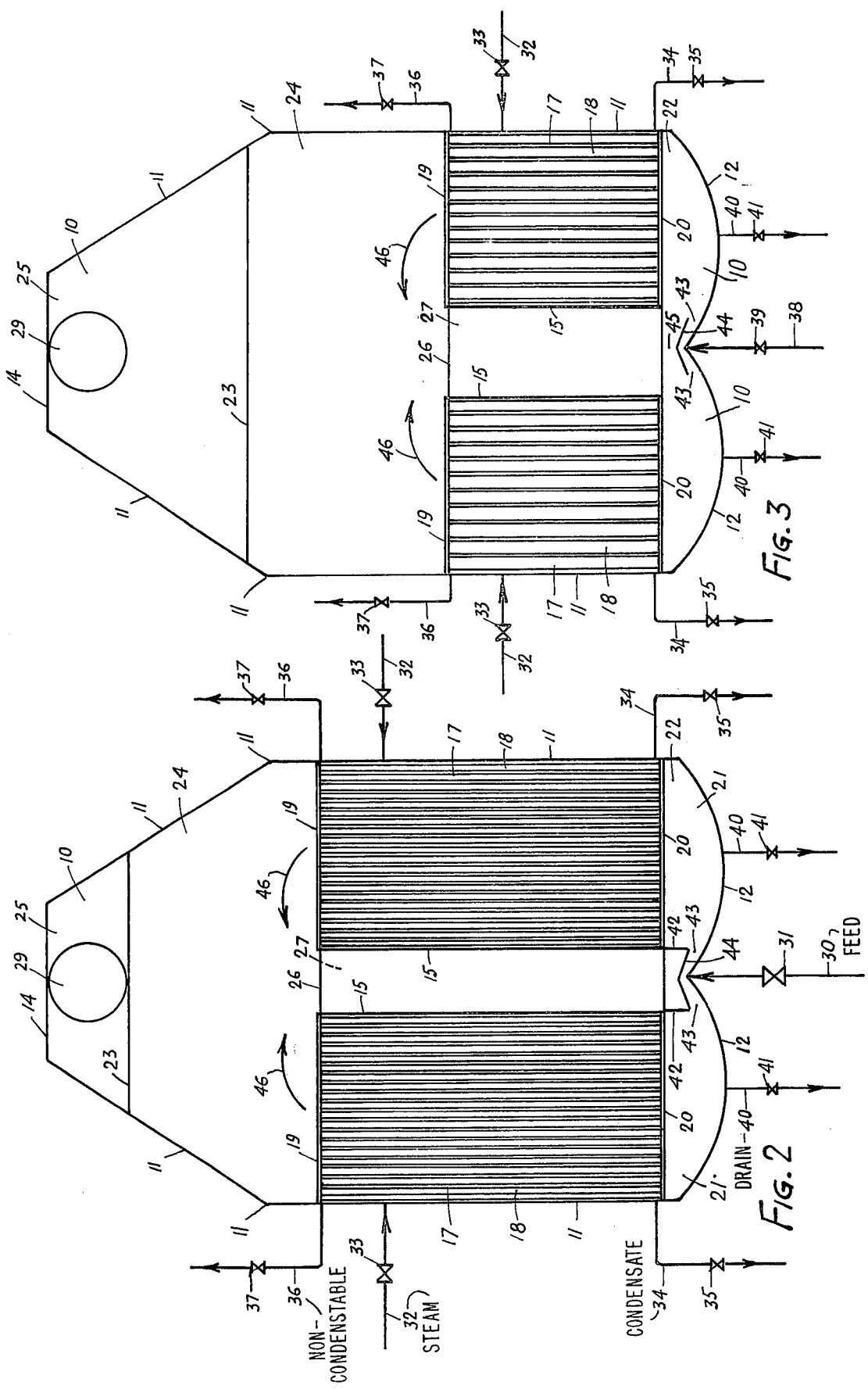

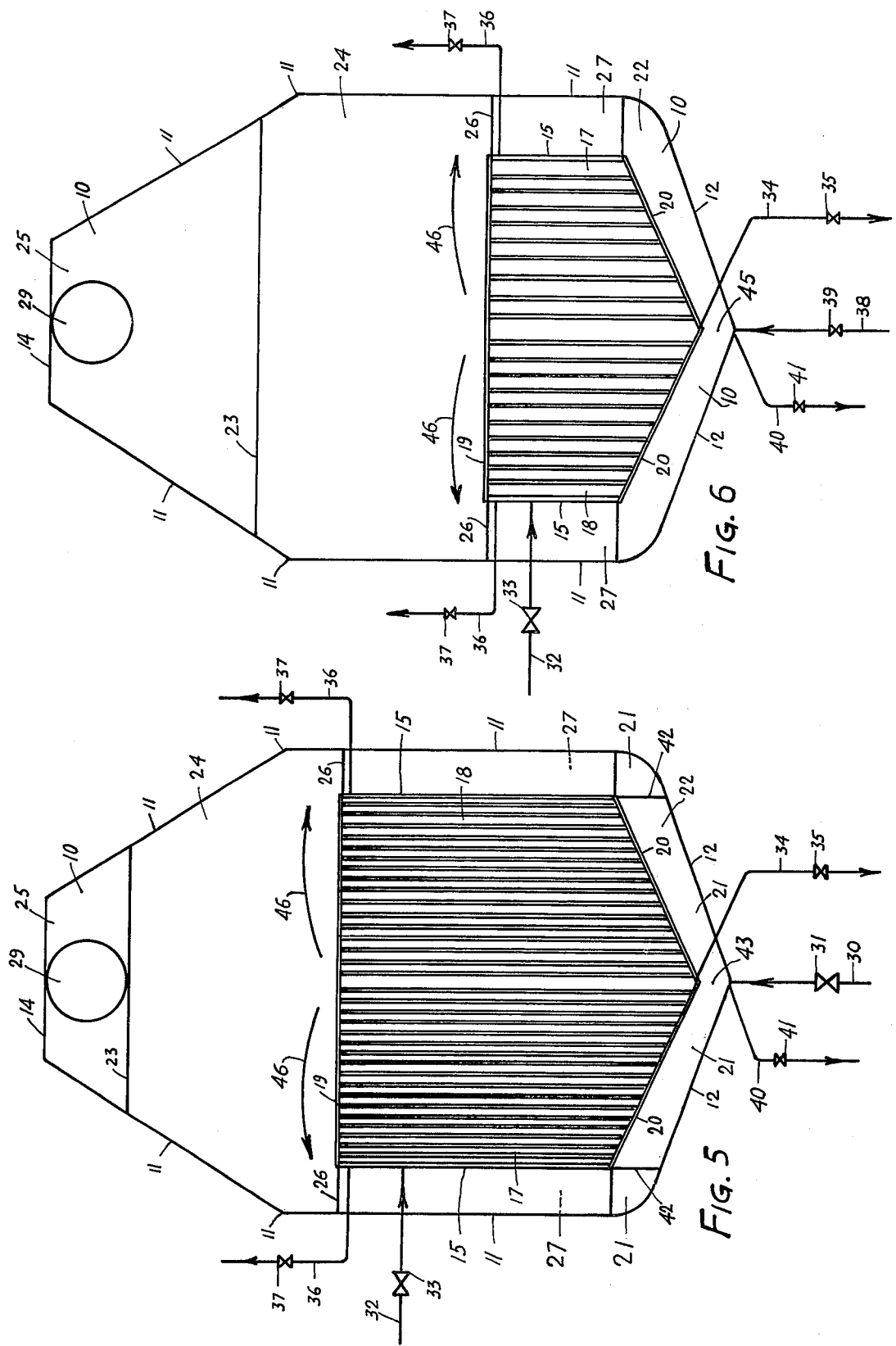

MULTISTAGE CONTINUOUS VACUUM PAN

BACKGROUND OF THE INVENTION

1. Field of the Invention

This invention relates to equipment used for the continuous boiling under vacuum of liquids such as juices for the development of sugar crystals, etc.

2. Prior Art

Hitherto, batch vacuum pans have been generally used in processes for the crystallization of sugar. However, such systems have so far proven insufficient, primarily due to the lack of uniformity of the resultant product.

Investigations from many directions have led to an accurate theoretical explanation of the problem and eventually to the conclusion that a new technique of boiling should be adopted which would require the use of continuous vacuum pans.

Numerous suggestions put forward by various authors and equipment manufacturers have led to the construction of prototypes of continuous vacuum pans, all of which however, have failed to satisfy the main condition of success, i.e., that of having a continuous flow of the material along the pan.

SUMMARY OF THE INVENTION

An object of the invention is to provide an improved pan for the continuous boiling of various liquids under vacuum.

It is a further object of the invention to provide an improved pan for the continuous development of seed crystals in a slurry through boiling under vacuum.

Another object of the invention is to provide such a pan which will prevent by-passing by the material of a portion of the pan flow path and thus assure a continuous flow of the material throughout the entire boiling process.

In accordance with this invention, a pan for the continuous boiling of various liquids under vacuum comprises an enclosed vessel divided into a series of interconnected compartments or stages each of which is provided with heating elements. During operation, the material to be processed enters the pan at one end to circulate continuously from stage to stage, while boiling under vacuum, and is eventually withdrawn at the other end of the pan.

BRIEF DESCRIPTION OF THE DRAWINGS

In the embodiments of the invention illustrated, two groups of drawings are included. The first group includes FIGS. 1, 2 and 3 showing the arrangement of a "centerflow" pan, whereas the second group includes FIGS. 4, 5 and 6 showing the arrangement of a "sideflow" pan. Both pans have similar underlying principles except that, in the case of the "centerflow" pan the material leaving the heating elements of one stage flows towards the center of the pan, whereas in the case of the "sideflow" pan the material flows toward the periphery of the pan, after leaving the heating elements.

In the two groups of drawings:

FIGS. 1 and 4 are each schematic cross sections through the longitudinal axis of the pan;

FIGS. 2 and 5 are each schematic cross sections through the first stage at the feed end of the pan, approximately along lines A—A and in the direction of arrows Z of FIGS. 1 and 4, respectively; and FIGS. 3 and 6 are each schematic cross sections through the last stage at the discharge end of the pan, typical of all intermediate stages, approximately along lines B—B of FIGS. 1 and 4, respectively.

DETAILED DESCRIPTION OF THE INVENTION

Figure 4:
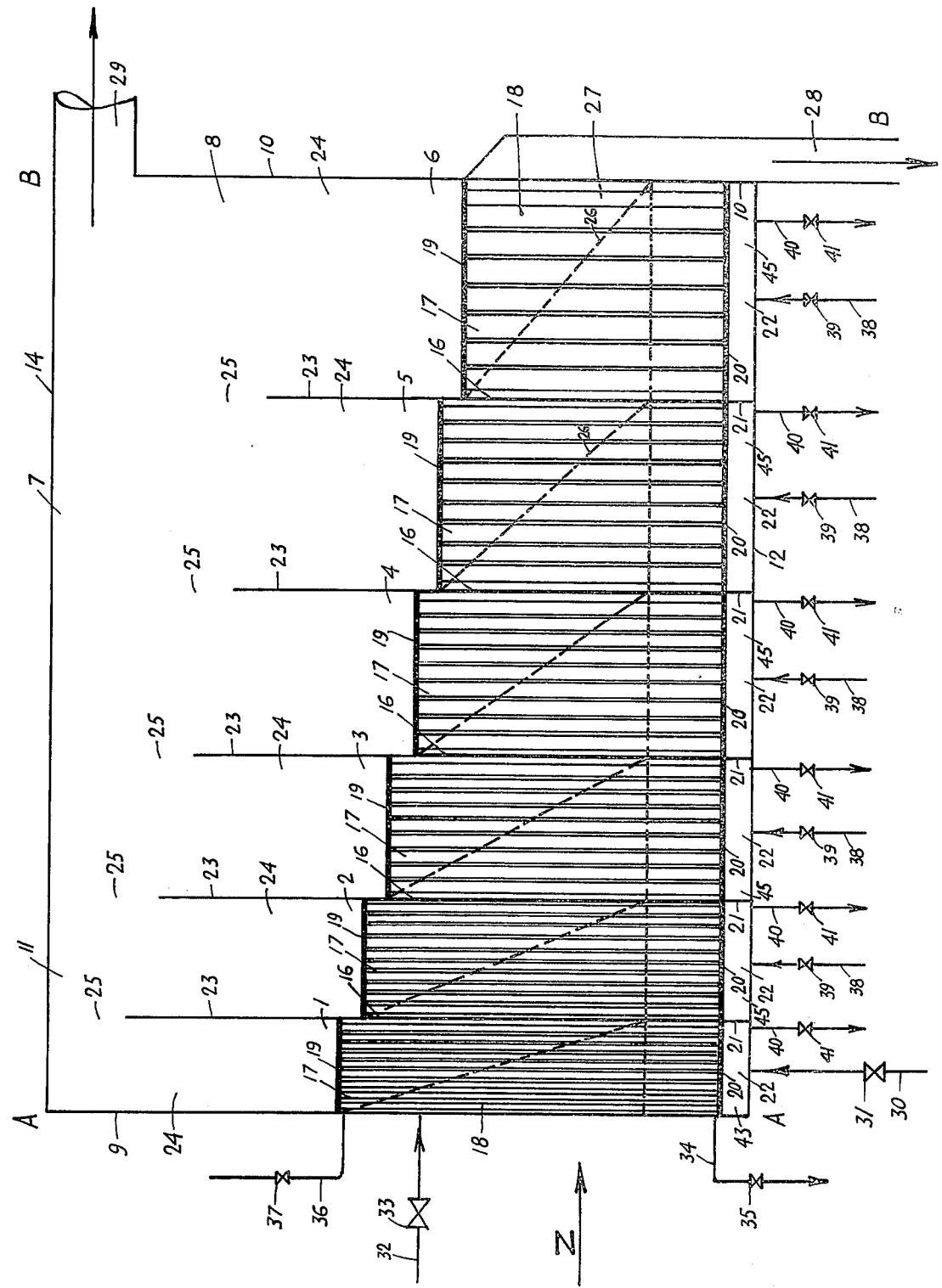

In the embodiments illustrated, the pan 7 extends from its feed end AA to its discharge end BB and comprises an enclosed vessel 8 formed by feed end plate 9, discharge end plate 10, sidewalls 11, bottom plates 12 and top cover 14.

Two vertical plates 15 run longitudinally from feed end plate 9 to discharge end plate 10 at distances from sidewalls 11, bottom plates 12 and top cover 14. In the case of the centerflow pan of FIGS. 1–3, the two spaces included between sidewalls 11 and plates 15 are divided, by means of partition plates 16, into a series of compartments which are occupied by heating elements 17. In the case of the sideflow pan of FIGS. 4–6, the space included between the two plates 15 are similarly divided, by means of partition plates 16, into a series of compartments which are occupied by heating elements 17. Heating elements 17, which may be of the coil, plate or straight tube type, are shown in the drawings to be of the straight tube type and made up of tubes 18 which extend vertically through and which are fastened to upper and lower tube plates 19 and 20, respectively, to form a series of tubular casings.

In line with partition plates 16, but extending completely transversely across vessel 8, are vertical plates 21 which divide the space included between lower tube plates 20 and bottom plates 12 into a series of compartments 22, and vertical plates 23 which divide the space included between upper tube plates 19 and top cover 14 into a series of compartments 24. Thus, the bores of all the tubes 18 lying in any one tubular casing interconnect two vertically opposite compartments 22 and 24 to form a series of stages 1, 2, 3, etc. (six are shown in the illustrated embodiments). A space 25 is left open between the top of each vertical plate 23 and top cover 14.

The central space included between plates 15, in the case of the centerflow pan, and the two lateral spaces included between plates 15 and sidewalls 11, in the case of the sideflow pan, are divided by means of forwardly and downwardly inclined plates 26 into a series of ducts 27 each of which connects compartment 24 of one stage to compartment 22 of the next succeeding or downstream stage, until after the last stage when duct 27 is connected to discharge port 28 of pan 7.

Pan 7 is conveniently connected to a condenser and vacuum system through port 29 and to appropriate devices by a network of pipes and valves such that, during operation, pan 7 is placed under vacuum. Steam is admitted to heating elements 17, around tubes 18, via pipes 32 and valves 33. Condensate is extracted via pipes 34 and valves 35. Incondensable gases escape through pipes 36 and valves 37. The material to be processed is introduced into compartment 22 of stage 1, the only compartment which is provided with two plates 42 that prevent the material from by-passing tubes 18, through pipe 30 and valve 31 via ports 43. The material then passes upwardly through tubes 18 where it is boiled and from where it emerges into compartment 24. The material then flows laterally to duct 27 and then forwardly and downwardly into compartment 22 of stage 2 via openings 45. The vapors evolved during boiling rise into compartment 24 and are withdrawn, via open spaces 25, through port 29 into the condenser. This sequence is repeated in each stage as the material flows continuously from one stage to the next until the processed material reaches duct 27 of the last stage of pan 7 from where it is withdrawn through discharge port 28.

In the centerflow pan of FIGS. 1–3, openings 43 are preferably located under and on each side of a deflector plate 44 which serves the purpose of causing the entering material to swerve in directions corresponding to the ambient circulation in compartment 22. Arrows 46 show respective directions of circulation of the material in compartments 24 prior to its downward and forward flow through ducts 27.

Additional material to be processed may be introduced into compartment 22 of each stage, except stage 1, through lines 38 and valves 29. Each compartment 22 is provided with drain pipes 40 and valves 41.

Circulation of the material through each stage is induced by the formation of vapor bubbles as the material passes through heating elements 17, thus reducing the weight and increasing the thickness of the material, as compared with the balancing column of the material in duct 27 which has no bubbles.

That is, a given amount of liquid material passing upwardly through heating elements 17 of stage 1 has vaporizable constituents removed therefrom, in the form of vapor which is removed through port 29. Thus, the total weight of the remaining liquid, passing downwardly through duct 27 into compartment 22 of stage 2, is lessened, even though such remaining material is thicker or denser. Thus, the stage-by-stage lessening of the total weight of the remaining material facilitates the upward flow of the material through heating elements and the downward flow of the material through the ducts.

However, in view of the fact that the material remaining after each stage gradually becomes thicker, it is provided that the internal diameters of tubes 18 are stage-by-stage increased, thus avoiding slowing of the overall flow of the material through the pan. The smaller diameter tubes at the earlier stages are desirable to provide greater relative heating surface contact with material having a greater proportion of vaporizable constituents.

Further, the heights of tubes 18 are stage-by-stage reduced. This has the advantage of reducing the hydrostatic head pressure of the material. Too great of a hydrostatic head would raise the boiling point of the material, particularly at the bottom of the tubes, with the resulting danger of color formation through carmelization of the sucrose. With the above in mind, the horizontal cross-sectional areas of the stages are increased stage-by-stage.

While specific embodiments of the invention have been illustrated and described, it is to be distinctly understood that the invention is not limited thereto but may be otherwise variously embodied within the scope of the following claims. For example, pan 7 may be of any convenient shape other than that shown in the present embodiment.

What I claim is:

1. A pan for the continuous boiling of liquid materials having vaporizable constituents therein, said pan comprising:
   a closed vessel divided into a plurality of successive stages;
   each said stage comprising:
   a lower liquid material receiving section separated from similar sections of adjacent stages;
   an upper vapor collecting section; and
   an intermediate heating section, separated from similar sections of adjacent stages, and having plural liquid material passageways vertically communicating said liquid material receiving section and a concentrated liquid material collecting zone lying between the top of the heating section and the bottom of the vapor collecting section;
   means for heating said plural liquid material passageways;
   means for introducing liquid material to be processed into said liquid material receiving section of the upstream-most of said stages;
   means for removing processed material from said vessel, from a discharge end of the downstream-most of said stages;
   a plurality of ducts, one each extending from the concentrated liquid material collecting zone of each said stage to the material receiving section of the next downstream stage, except said downstream-most stage, and from the concentrated liquid material collecting zone of said downstream-most stage to said processed material removing means, each of said ducts being isolated from each other;
   whereby liquid material passes from stage to stage by moving from each liquid material receiving section upwardly through the heating section thereabove into the concentrated liquid material collecting zone thereabove and through one of said ducts to the liquid material receiving section of the next downstream stage, said liquid material being boiled in each said heating section, and vapor resulting from such boiling being collected in each said vapor collecting section;
   means connected to said vessel and in communication with all of said vapor collecting sections as a common section for creating a vacuum in said vessel and for removing vapor from said vapor collecting sections;
   the height of said liquid material passageways being successively lower stage-by-stage in the downstream direction of said vessel, whereby the hydrostatic head of the liquid material is stage-by-stage reduced; and
   the cross-sectional areas of said liquid material passageways being successively greater stage-by-stage in the downstream direction of said vessel.

2. A pan as claimed in claim 1, further comprising means for selectively introducing additional liquid material into each of said stages to maintain a desired concentration of said liquid material.

3. A pan as claimed in claim 1, wherein said ducts extend downwardly and forwardly from one stage to the next downstream stage.

4. A pan as claimed in claim 1, wherein said liquid material passageways of each said stage comprise a plurality of vertically extending tubes extending through upper and lower tube plates defining closed spaces enclosing said tubes.

5. A pan as claimed in claim 4, wherein said heating means comprises means for introducing steam into said closed spaces enclosing said tubes.

6. A pan as claimed in claim 1, wherein the horizontal cross-sectional area of said stages successively increases stage-by-stage in the downstream direction of said vessel.

7. A pan as claimed in claim 1, wherein each of said heating sections comprise laterally separated partial sections; and wherein each said duct is formed by inclined plates extending between said separated partial sections.

8. A pan as claimed in claim 1, wherein each said duct comprises a pair of laterally separated ducts, one each formed by inclined plates extending between said heating section and an opposite side wall of said vessel.

* * * * *